United States Patent
Bayer

(10) Patent No.: US 8,561,632 B2
(45) Date of Patent: Oct. 22, 2013

(54) QUICK-ACTING VALVE HAVING METERING RELIEF

(75) Inventor: Reinhardt Bayer, Duisburg (DE)

(73) Assignee: BEDA Oxygentechnik Armaturan GmbH, Ratingen (DE)

( * ) Notice: Subject to any disclaimer, the term of this patent is extended or adjusted under 35 U.S.C. 154(b) by 416 days.

(21) Appl. No.: 12/974,312

(22) Filed: Dec. 21, 2010

(65) Prior Publication Data

US 2011/0198523 A1  Aug. 18, 2011

(30) Foreign Application Priority Data

Feb. 18, 2010 (DE) .................... 10 2010 008 527

(51) Int. Cl.
*F16K 1/12* (2006.01)

(52) U.S. Cl.
USPC ... 137/219; 137/495; 137/625.3; 137/625.33; 251/50; 251/282

(58) Field of Classification Search
USPC ............ 137/219, 625.3, 625.33, 495; 251/50, 251/282
See application file for complete search history.

(56) References Cited

U.S. PATENT DOCUMENTS

| | | | | |
|---|---|---|---|---|
| 2,938,533 A * | 5/1960 | Jensen et al. | ................ | 137/219 |
| 3,036,587 A * | 5/1962 | Silver | ................ | 137/219 |
| 4,051,870 A * | 10/1977 | Nordentoft | ................ | 137/636.2 |
| 4,693,268 A * | 9/1987 | Fahl | ................ | 137/219 |
| 5,002,263 A * | 3/1991 | Marmann | ................ | 266/225 |
| 5,106,061 A * | 4/1992 | Marmann | ................ | 266/225 |
| 2005/0224742 A1* | 10/2005 | Seong | ................ | 251/231 |

* cited by examiner

*Primary Examiner* — Craig Schneider
(74) *Attorney, Agent, or Firm* — James Creighton Wray

(57) ABSTRACT

A quick-acting valve 1 having metering relief is used in particular for oxygen lances, wherein the actual sealing body 10 inside the valve tube 2 has a two-part design and accommodates the valve spring 8 with the housing parts 16 and 17 of the spring. The gas is conducted around the sealing body 10, so that the gas pressure cannot have an effect on the actuation by way of the hand lever 3. The rear housing part 17, which is located behind the front housing part 16 can be displaced inside the front housing part 16, and has a flow-promoting design, being displaced against the force of the valve spring 8, and specifically with the help of the hand lever 3, so that it now can be actuated independently of the gas pressure with precise metering control.

12 Claims, 4 Drawing Sheets

QUICK-ACTING VALVE HAVING METERING RELIEF

This application claims the benefit of German Application No. 10 2010 008 527.8 filed Feb. 18, 2010, which is hereby incorporated by reference in its entirety as if fully set forth herein.

The invention relates to a quick-acting valve having metering relief for oxygen lances and tubes conducting other, easily flammable gases that are present at a pressure of several bars, wherein the gas volume passing the valve is controlled manually, for which purpose a sealing body is arranged in the flow passage, the sealing body being axially displaceable against the force of a valve spring and held in a sealing seat by the valve spring and the sealing body, by way of a shoulder protruding on the side facing away from the gas inflow, being displaceable by the pressure part of a hand lever pivotably attached to the valve tube in such a way that the sealing body is carried along in the flow passage.

Such quick-acting valves are required, to open or close the gas line or media line in the vicinity of the consumer when gas is supplied. Gas lines, regardless of whether they are steel or hose lines, are designed to withstand higher pressure, for example of 16 bars. In the rotary valve known from DE-GM 20 2007 008 369.6, gas metering is possible within a certain range, however this requires relatively high complexity. It is particularly problematic that in these rotary valves a dead man's circuit can only be achieved with even greater complexity, if at all. In contrast, in known lever valves, this dead man's circuit can be easily achieved in that the lever automatically moves into the closed position under the spring pressure when the consumer releases the lever. This, of course, applies primarily to the sealing body provided for closing. This sealing body is under a load from a valve spring added on the outside and must be moved as the entire body, this being with the entire surface thereof, out of the sealing seat against the gas pressure that is present and the pressure of the valve spring. Of course this is also possible by using the hand lever, but only when applying an appropriate amount of force, and has the disadvantage that even approximately precise metering of the passing gas volume is not possible. It is also a disadvantage that impurities in the gas, or refluent glowing ashes or dust, may damage the spring seated on the outside of the sealing body, so that the valve no longer closes, but rather allows the problematic oxygen to pass, which is associated with danger for the operator.

It is therefore the object of the invention to create a quick-acting valve, particularly for oxygen lances, which enables precise metering of the out-flowing gas volume with a low amount of force, and does so even with a longer service life.

The object is achieved according to the invention in that the sealing body is designed in two parts and is hollow, and accommodates the valve spring, that the housing part facing the gas inflow is fixed in the flow passage, and that the rear housing part is held in a displaceable manner in the front housing part, releasing the sealing seat against the force of the valve spring and, conversely, is held in the sealing seat by the valve spring.

In a quick-acting valve having such a design, the valve spring, which in the event of a hazard situation must ensure that the valve is closed, is accommodated with such protection that it can safely perform its important duty. It is also advantageous that the valve spring is no longer located in the gas stream and can thus not be impaired by the flow. In this way, an approximately laminar flow can be achieved, which is important for the oxygen, by skillfully designing both the sealing body and the flow passage. Since the rear housing part is pushed back and forth without any pressure difference between the front and rear housing parts, thereby releasing the sealing seat or being pushed into the sealing seat, the sealing body region that is important for sealing can be pushed back and forth by the pressure of the inflow gas, without being influenced. As a result, fine metering control is possible, which is extremely important in particular when lighting the oxygen lance. Due to a low gas supply, the gas flame at the end of the oxygen lance can be lit easily and safely, and then the further pressure can be continuously increased, more specifically to a level that is exactly right for the respective application. As a result of this skilful arrangement of the sealing body, or of the part of this sealing body important for sealing, such a quick-acting valve can also be operated without difficulty by women, for example, which in addition to the fine metering control may also be a further advantage for the operation. The pressure to be applied by the hand of the operator remains practically the same under all pressure ranges, even if it also has to influence the air pressure developing in the hollow valve spring space. However, as is explained below, additional remedies are available for this, so that the smooth operation and exact metering control described here shall be emphasized as a crucial advantage.

According to an advantageous embodiment of the present invention, the front housing part is connected or mounted to the apex extending into the gas inflow to the wall of the flow passage by way of a perforated ring. In this way, it is possible to move the rear housing part into the front housing part and tension the spring in the process, or conversely. As a result of the perforated ring, simple and precise mounting of the front housing part acting as an abutment is possible, wherein the perforated ring ensures that the gas flowing in through the flow passage can be conducted past the actual sealing body in an approximately laminar fashion, so as to preserve, or at least largely to preserve, the body from the pressure of the gas. The apex uniformly divides the gas stream fed from the flow passage and conducts it through the perforated ring, which is to say through the individual bores of the perforated ring, whereby also the laminar guidance is favored.

In the event a problem, back-flowing liquid steel is advantageously stemmed inside the quick-acting valve when, according to the invention, an annular channel is configured downstream of the perforated ring, as viewed from the gas inflow, with the ring having preferably 20 bores and a 25 mm channel diameter. The liquid steel collects in this annular channel and cannot pass the many relatively small bores of the perforated ring, or it solidifies, whereby the risk is also considerably reduced or even averted.

The laminar configuration of the gas stream is additionally promoted in that the apex is designed so as to transition into the rounded roof of the front housing part and guides the gas flow in an approximately laminar fashion. This can be achieved in particular when the apex sits with a relatively small dimension on this rounded housing part, so that the gas flow, as already mentioned above, can be divided very uniformly and conducted through the downstream bores in the perforated ring. The valve spring is arranged in the front housing part and is supported both at the corresponding end of the radial bore located therein and at the end of the axial bore of the rear housing part. As the preceding explanation shows, this valve spring is therefore entirely enclosed and protected from the gas stream.

As was already mentioned, the two housing parts are disposed so as to be displaceable within one another and designed to load or relieve the valve spring. It is advantageous if an open housing sleeve of the rear housing part, which can be displaced in the front housing part, has a cylindrical shape and comprises two sealing rings on the outer side, wherein the front housing part has a corresponding internal bore. This means that the housing sleeve of the rear housing part can be displaced in a corresponding internal bore of the front housing part, wherein the two sealing rings ensure that the inner space or hollow space accommodating the valve spring is sealed with respect to the gas pressure that is present. By way of the selection of the sealing rings and the selection of the configuration, it can be ensured that the friction on the inside wall of the internal bore, which must be overcome, is relatively low, so that in this way no significantly increased force is required for sliding the rear housing part of the sealing body back and forth.

As was already mentioned, the development of an air cushion in the described hollow space can be prevented, wherein for this purpose the housing sleeve comprises an axial bore which is designed to transition into a radial bore ending beyond the sealing bevel of the rear housing part and to thereby establish a flow connection to the flow passage or bypass channel. In this way, no additional pressure can be created when the two housing parts are pushed together, and by using the hand lever, only the exactly preselected force of the valve spring must be overcome. When closing the valve, it is also only the valve spring that is decisive, and not any positive air pressure that may have developed in the hollow space. The air pressure developing in the hollow space during the movement of the two housing parts is reduced, as described, by the axial bore and radial bore, this air then mixes with the oxygen gas and can be discharged completely safely, in particular since such a gas mixture can be decisive for the formation of an air cushion in the hollow space.

An assembly of such a quick-acting valve is favored in that the shoulder with the sealing bevel of the rear housing part comprises corresponding threads, and the sealing bevel with the sealing ring corresponding to the sealing seat can be connected so as to be fixed with respect to the housing sleeve. The shoulder is rotated into the rear housing part, carries along part of the sealing bevel in the process, and clamps the same and the sealing ring with respect to the remaining part of the rear housing part, so that the sealing ring has its position, and so does, of course, the sealing bevel.

The sealing bevel with the sealing ring, together with the sealing seat, ensures that a tight seat of the valve is established at all times, without influence from the hand lever. During opening, even with a slight movement of the hand lever, the gas, primarily oxygen, flows in a particular amount through the quick-acting valve, wherein this is possible in a largely laminar fashion, because the bypass channels formed by the bores of the perforated ring transition into inclined bores starting behind the sealing seat, so that the gas can flow from there and transition into perforated channels leading past the handle recess. Because, given the shape of the quick-acting valve, the perforated ring with the bores thereof approximately allows a gas passage that corresponds to the flow passage, and the subsequent inclined bores and the perforated channels also provide such a cross-section, accordingly large amounts of gas can be removed once the oxygen lance has been lit. Instead of previously 145 $Nm^3/h$, it is now possible to conduct 270 $Nm^3/h$ at 6 bars through such a quick-acting valve, without incurring the slightest risk due to the amount of gas or oxygen. Especially in the case of oxygen, any turbulence that occurs would also be associated with the risk of ignition or other problems, which is excluded by the laminar guidance of the oxygen through the quick-acting valve.

The described guidance of the gas is promoted by the skilful arrangement of the inclined bores and the inclined bore space, which is achieved in particular by associating the sealing seat and the inclined bores with an insertion part guiding the shoulder and by disposing a sealing part, which seals the inclined bore space and comprises an annular rib, on the shoulder. This entire region becomes gas-tight by way of the sealing part and the annular rib, which are disposed displaceably on the shoulder and rest against it in a sealing manner, so that no gas, in particular oxygen, can accidentally flow into the region of the handle recess. Rather the gas or the oxygen is forced to use the predetermined channel paths. This sealing part with annular rib is made of an appropriately flexible material, such as special rubber, and may be disposed in the insertion part in a corresponding annular recess, so that it does not experience excess strain, even when screwing on the quick-acting valve, and instead always remains arranged in a sealing manner.

A smoothly operating quick-acting valve is further optimized by designing the hand lever so as to pivot about a shall, which is arranged at the edge of the handle recess, and comprises a ball which is arranged in the pressure region, on the protruding pressure part. The hand lever is thus an extended pressure part and can then deliberately act on the shoulder and open the valve, or allow closure. The ball ensures that the friction created by the pressure part of the hand lever and the shoulder passing by each other is not too large. To this end, the ball is positioned in the pressure part and ensures that no frictional forces can occur.

Exact positioning of the ball is achieved according to one embodiment of the invention by associating the ball with a screw mount that can be screwed into the pressure part, and by designing the free tip of the shoulder to be beveled or cut off or depressed. The ball and the pressure part cannot give way and slide past each other, but instead the ball always ensures that the force of the hand lever is transmitted uniformly and safely to the shoulder, and thus to the entire valve.

It has already been pointed out above that the entire quick-acting valve is composed of a relatively small number of components, wherein these components can be arranged easily and advantageously inside the valve tube when the sealing body is mounted to the shoulder, and the insertion part can be mounted to the inclined bores, in the valve tube by way of a threaded sleeve. At the same time, the threaded sleeve comprises an external thread at the free end, so that the connection to a hose line or a tube can be easily accomplished.

The invention is characterized in particular in that a quick-acting valve is created, which has high metering control, which applies even in the lower range of the transiting gas volume. This provides the opportunity, when lighting an oxygen lance, for example, to manually feed precisely the optimal amount of gas or oxygen for the lighting process using such a quick-acting valve. It is further advantageous that the quick-acting valve is designed such that the transiting gas flow can be largely kept in a laminar fashion, so that practically no hazards arise inside the quick-acting valve. The gas is conducted past the sealing body so that the body can be pushed back and forth with minimal influence by the gas pressure, and specifically manually by way of the hand lever. The valve spring is advantageously accommodated inside a two-part sealing body, so that it is secured both against the gas pressure and against hazards of the gas flowing by. The hollow space in which it is accommodated, is connected to the discharging gas channel, so that no positive pressure or the like can occur. Finally, for good handling, it is particularly important that the two-part sealing body comprises two housing parts, which can be displaced within one another, wherein the rear sealing part, as viewed from the gas inflow, is pushed into the other sealing part, which takes place with minimal influence from the gas pressure that is present. The front housing part serving as an abutment is fixedly disposed in the flow passage, and specifically by way of a perforated ring, the bores of which are selected so that, in the event a problem arises with back-flowing liquid steel, this liquid steel is held back and therefore rendered harmless, wherein the housing as a whole is made of special brass, which can dissipate the temperature. On an overall basis, the inside of the quick-acting valve is designed to ensure a gas flow that is suitable for oxygen in the manner described.

Additional details and advantages of the subject matter of the invention will be apparent hereinafter from the description of the related drawings, which show a preferred embodiment with the necessary details and parts. In the drawings:

DETAILED DESCRIPTION OF THE PREFERRED EMBODIMENTS

Figure 1:
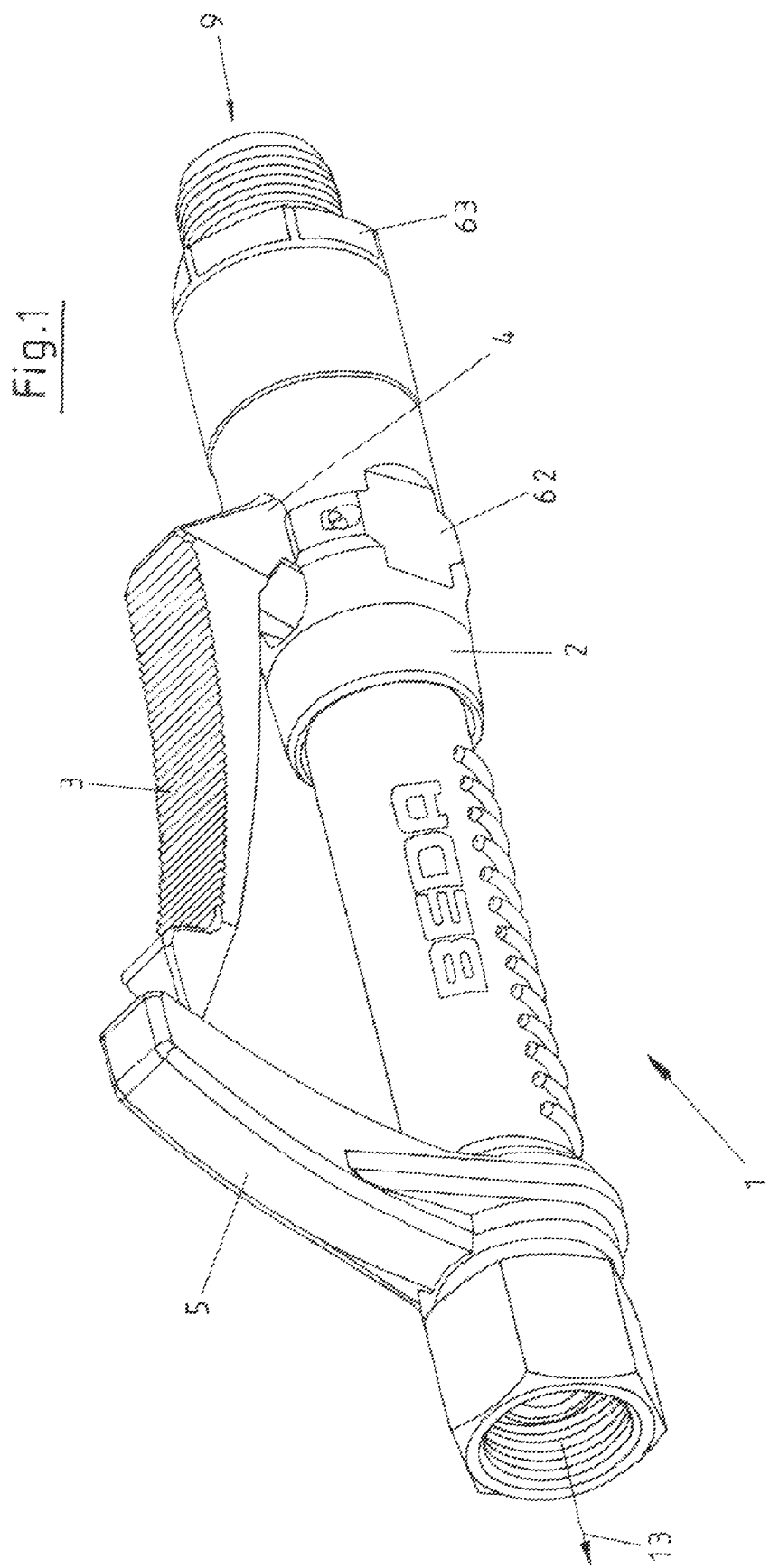
FIG. 1 shows a quick-acting valve in a perspective view.

FIG. 1 shows one such valve 1, which is to say a quick-acting valve, which is equipped with a hand lever 3. This hand lever 3 is disposed on the outside of the valve tube 2 and comprises a pressure part 4, which is not clearly shown here and which is used to act on the actual valve or sealing body 10, which likewise is not illustrated here. The hand lever 3 on the valve tube 2 is held in the closed position by way of a securing strut 5, so that in the event of a hazardous situation, a simple dead man's circuit can be implemented. When the operator releases the hand lever 3, it rebounds into the valve closing position by way of the valve spring 8, which is not illustrated here, and the shoulder 15, so that no additional gas, and in particular oxygen, can pass this valve 1.

Reference numeral 9 denotes the gas inflow, and reference numeral 13 denotes the discharge of the gas in the direction of the oxygen lance. Reference numerals 62 and 63 denote the abutment surfaces, which during assembly of the valve 1 enable the advantageous use of a key or similar auxiliary device.

Figure 2:
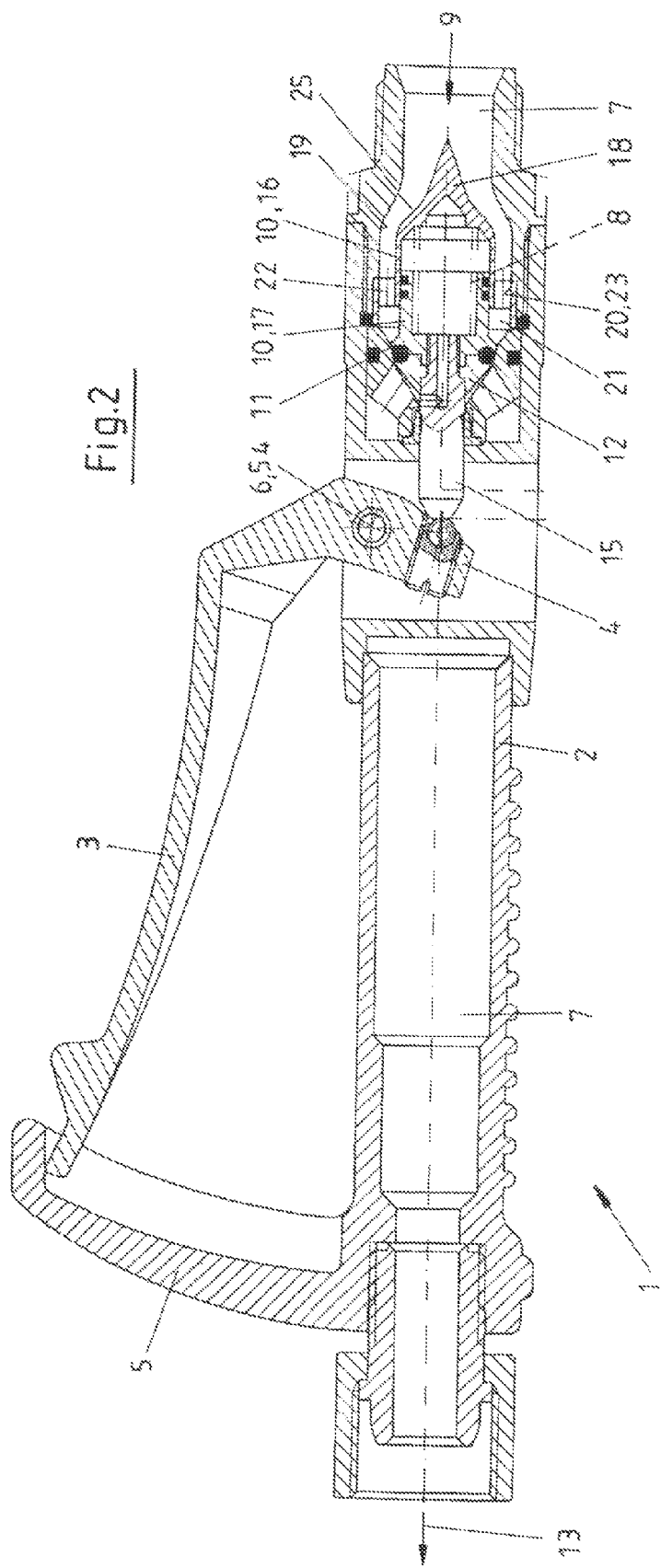
FIG. 2 is a longitudinal section through this quick-acting valve.

FIG. 2 shows a longitudinal section through this valve 1, wherein it is also apparent that the hand lever 3 is held in the shown closed position of the valve 1 by way of the securing strut 5. The lever maintains this position, so that, if necessary, the operator can immediately operate the valve 1 again to open it.

The gas inflow occurs from the direction of 9 and is guided around the actual sealing body 10 by the apex 18 of the sealing body 10. The flow passage 7 transitions into a type of bypass channel 38, so that the actual housing of the sealing body 10 is held largely free of the pressure of the gas that is present.

The hand lever 3 is pivoted about the pivot point 6, so that the pressure part 4 can act on the shoulder 15 of the sealing body 10 and deliberately moves the same out of the sealing seat 11. This sealing seat 11 interacts with the far side 12 of the sealing body 10 and ensures that no gas can pass this region in the closed position. To this end, the sealing body 10 is pressed into the sealing position or closing position by the indicated valve spring 8 and held in place. The sealing body 10 can be lifted out of the sealing seat 11 against the resilient force of the valve spring 8 by way of the hand lever 3 and the pressure 4 as well as the shoulder 15.

Figure 3:
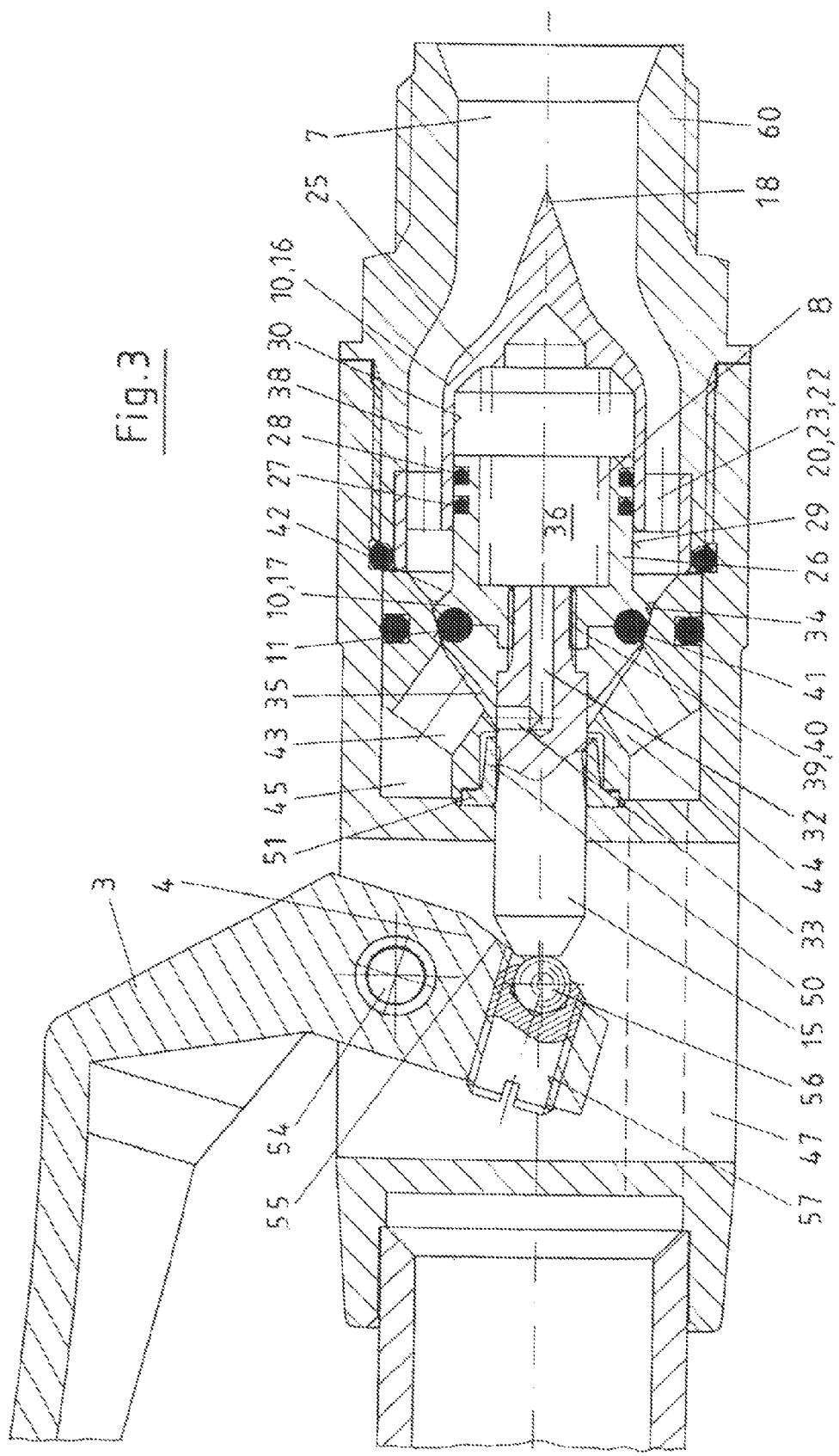
FIG. 3 is an enlarged illustration of the valve tube region comprising
the closing mechanism and the necessary components.

In the illustrated example, which is particularly clearly apparent from FIG. 3, the sealing body 10 has a two-part design, wherein the front housing part 16 is fixed to the wall 19 of the flow passage 7 by way of a perforated ring 20. The rear housing part 17 is displaceably arranged in the fixed front housing part 16, for which purpose the housing sleeve 26 thereof, with the sealing rings 27, 28, has a cylindrical design and is adapted to the internal bore 30 of the front fixed housing part 16. The sealing rings 27, 28 ensure that the gas cannot act on this region, and in particular on the valve spring 8 located in the hollow space. The sealing rings 27, 28 are disposed on the outer side 29 of the housing sleeve 26. This housing sleeve 26 is connected to the shoulder 15 by a thread 39, 40, wherein the sealing bevel 34 is pressed with the sealing ring 41 against the housing sleeve 26 and the sealing seat 11.

An axial bore 32 is provided in the shoulder 15 and ensures, together with the radial bore 33 at the end, that the hollow space 36 accommodating the valve spring 8 is connected to the discharging channels or the inclined bores 43, 44 for pressure relief purposes.

These inclined bores 43, 44 in the insertion part 46 ensure, together with the inclined bore space 45, that, when the valve is open, the gas can flow out through the flow passage 7, the bypass channel 38, and then these specifically inclined bores 43, 44, and specifically into the perforated channel or channels. These perforated channels 48 lead past the handle recess 47 and enable a largely laminar flow of the gas.

The special configuration of the fixed front housing part 16 has already been addressed. It is apparent that the apex 18 is designed so that the inflowing gas can flow out, in uniformly divided form, in the direction of the bypass channel 38. The bores 22, 23 forming the perforated ring 20 then form part of the bypass channel 38. The position and configuration of this perforated ring is particularly clearly apparent from FIG. 4, wherein here also the two sealing rings 27, 28 on the outer side 29 of the housing sleeve 26 can be seen. For additional, favorable guidance of the gas stream, the rounded roof 25 of the front housing part 16 should also be mentioned.

The perforated ring with the bores 22, 23 thereof transitions into an annular channel 21, from where, when the valve 1 is open, the inflowing gas can flow past the sealing seat 11 in the direction of the inclined bores 43, 44.

FIG. 3 clearly shows that the gas pressure acting on the housing or on the sealing body 10 is markedly low, because subsequent to the annular channel 21, the gas pressure acts only on a small protrusion 42 of the rear housing part 17.

Figure 4:
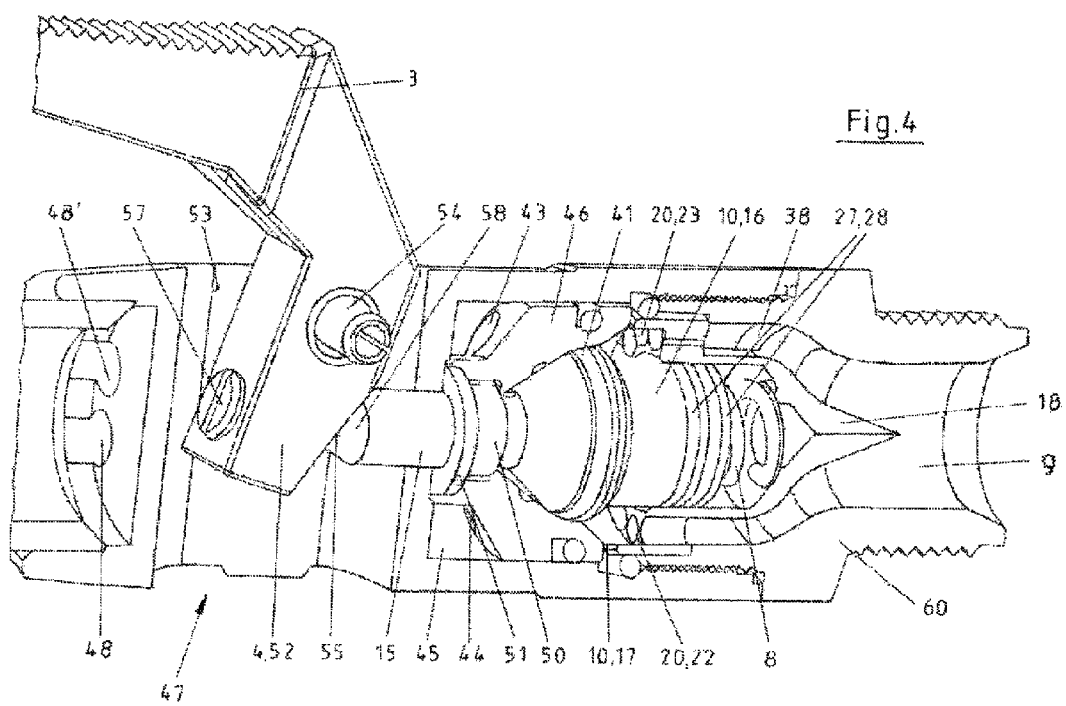
FIG. 4 is an oblique view of this region, so that the inclined bores and the perforated ring are easy to see.

FIG. 2 and FIG. 4 illustrate the mode of action of the hand lever 3 with the pressure part 4, wherein it is apparent both from FIG. 2 and from FIG. 4 that the pressure part 4 of the hand lever 3 is extended by placing the shaft 54, or the pivot point 6, close to the edge 53 of the handle recess 47. A ball 56 is disposed at the tip 52 of the pressure part 4 in the pressure region 55. This ball is guided in a screw mount 57 and ensures that the pressure on the shoulder 15 is as uniform as possible. The screw mount 57 makes it possible to adjust the distance from the free tip 58 of the shoulder 15 within a certain range. The free tip 58 of the shoulder 15 is cut off, or depressed, or configured in another manner, so as to ensure uniform impingement and action of the ball 56 on the shoulder 15.

The part or parts ensuring the tightness of the valve 1 are accommodated in a cylinder cup-like part of the valve tube 2. The connection to the hand lever 3 and the pressure part 4 is established by way of the shoulder 15, wherein this region is sealed by a sealing part 50 having an annular rib 51. The same is apparent from FIGS. 2 and 3, and in particular from FIG. 4. The shoulder 15 pierces through the bottom of this cylindrical cup, while the insertion part 46 with the inclined bores 43, 44 and the sealing body 10—with the valve spring 8 provided inside—are placed in from above and inserted via the shoulder 15. The necessary closure, and thus the locking of the front housing part 16 to be mounted, is achieved by the threaded sleeve 60, which at the other free end comprises an external thread, so that further tubes or hoses can be connected here.

Easily apparent from FIG. 4 are also the perforated ring 20 having the bores 22, 23 and the annular channel 21, as well as the arrangement of the inclined bores 43, 44 and the perforated channels 48, 48'.

All above characteristics, including those revealed solely in the drawings, are considered essential for the invention, either alone or in combination with each other.

The invention claimed is:

1. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow to accommodate the valve spring (8) and entirely enclose the valve spring (8) from the gas inflow (9); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8).

2. The quick-acting valve according to claim 1, wherein the front housing part (16), with an apex (18) extending into the gas inflow (9), is connected or fixed to the wall (19) of the flow passage (7) by way of a perforated ring (20).

3. The quick-acting valve according to claim 2, wherein when viewed from the gas inflow (9), an annular channel (21) is formed behind a perforated ring (20) with preferably 20 bores (22, 23) of 25 mm channel diameter.

4. The quick-acting valve according to claim 2, wherein the apex (18) is designed so as to transition into a rounded roof (25) of the front housing part (16) and guide the gas flow in an approximately laminar fashion.

5. A quick-acting valve according to claim 1, wherein an open housing sleeve (26) of the rear housing part (17), the sleeve being displaceable in the front housing part (16), is designed to be cylindrical and comprises two sealing rings (27, 28) on an outer side (29), wherein the front housing part (16) has a corresponding internal bore (30).

6. A quick-acting valve according to claim 1, wherein the hand lever (3) is designed so as to pivot about a shaft (54) which is arranged at the edge of a handle recess (47), and comprises a ball (56) which is arranged in a pressure region (55) on the pressure part (4).

7. The quick-acting valve according to claim 6, wherein the ball (56) is associated with a screw mount (57) that can be screwed into the pressure part (4), and a free tip (58) of the shoulder (15) is designed to be beveled or cut off or depressed.

8. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow, and accommodates the valve spring (8); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8), wherein an open housing sleeve (26) of the rear housing part (17), the sleeve being displaceable in the front housing part (16), is designed to be cylindrical and comprises two sealing rings (27, 28) an outer side (29), wherein the front housing part (16) has a corresponding internal bore (30), wherein the housing sleeve (26) comprises an axial bore (32) which is designed to transition into a radial bore (33) ending beyond a sealing bevel (34) of the rear housing part (17) and thereby establishes a flow connection (35) to the flow passage (7) or bypass channel (38).

9. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow, and accommodates the valve spring (8); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8), wherein the shoulder (15) with the sealing bevel (34) of the rear housing part (17) comprises corresponding threads (39, 40), and the sealing bevel (34) with a sealing ring (41) corresponding to the sealing seat (11) can be connected so as to be fixed in position with respect to the housing sleeve (26).

10. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow, and accommodates the valve spring (8); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8), wherein bypass channels (38) are formed by bores (22, 23) of the perforated ring (20) and transition into inclined bores (43, 44) that comprise an inclined bore space (45) and begin behind the sealing seat (11), and from there they transition into perforated holes (48) leading past a handle recess (47).

11. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow, and accommodates the valve spring (8); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8), wherein the sealing seat (11) and the inclined bores (43, 44) are associated with an insertion part (45) guiding the shoulder (15), and a sealing part (50)—which seals the inclined bore space (45) and comprises an annular rib (51)—is arranged on the shoulder (15).

12. A quick-acting valve having metering relief for oxygen lances and tubes conducting other, easily flammable gases that are present at a pressure of several bars, with the gas volume passing the valve (1) being controlled manually, for which purpose a sealing body (10) is arranged in the flow passage (7), the sealing body being axially displaceable against the force of a valve spring (8) and held by way of the valve spring (8) in a sealing seat (11), and with the sealing body, by way of a shoulder (15) protruding on a side (12) facing away from a gas inflow (9), being displaceable by a pressure part (4) of a hand lever (3) pivotally attached to a valve tube (2) in such a way that the sealing body (10) is carried along in the flow passage (7), wherein the sealing body (10) is designed in two parts and is hollow, and accommodates the valve spring (8); a front housing part (16) facing the gas inflow (9) is fixed in the flow passage (7), and a rear housing part (17) is held in a displaceable manner in the front housing part (16) so as to release the sealing seat (11) against the force of the valve spring (8) and, conversely, is held in the sealing seat (11) by the valve spring (8), wherein the sealing body (10) can be mounted to the shoulder (15), and an insertion part (46) can be mounted to the inclined bores (43, 44), by means of a threaded sleeve (60) in the valve tube (2).

* * * * *